(12) United States Patent
Merkley et al.

(10) Patent No.: US 6,676,744 B2
(45) Date of Patent: Jan. 13, 2004

(54) FIBER CEMENT COMPOSITE MATERIALS USING CELLULOSE FIBERS LOADED WITH INORGANIC AND/OR ORGANIC SUBSTANCES

(75) Inventors: Donald J. Merkley, Alta Loma, CA (US); Caidian Luo, Alta Loma, CA (US)

(73) Assignee: James Hardie Research Pty Limited (AU)

( * ) Notice: Subject to any disclaimer, the term of this patent is extended or adjusted under 35 U.S.C. 154(b) by 129 days.

(21) Appl. No.: 09/969,957

(22) Filed: Oct. 2, 2001

(65) Prior Publication Data

US 2002/0088584 A1 Jul. 11, 2002

Related U.S. Application Data

(60) Provisional application No. 60/237,850, filed on Oct. 4, 2000.

(51) Int. Cl.$^7$ .......................... C04B 16/00; C04B 16/06; C04B 20/00; C04B 38/00
(52) U.S. Cl. ....................... 106/674; 106/720; 106/729; 106/805
(58) Field of Search .................. 106/805, 729, 106/720, 674

(56) References Cited

U.S. PATENT DOCUMENTS

| 1,571,048 | A |   | 1/1926  | Garrow        |
|-----------|---|---|---------|---------------|
| 2,156,308 | A | * | 5/1939  | Schuh ........... 162/154 |
| 2,156,311 | A | * | 5/1939  | Schuh ........... 162/154 |
| 2,175,568 | A |   | 10/1939 | Haustein      |
| 2,377,484 | A |   | 6/1945  | Elmendorf     |
| 3,264,125 | A |   | 8/1966  | Bourlin       |
| 3,748,160 | A |   | 7/1973  | Carbajal      |
| 3,753,749 | A |   | 8/1973  | Nutt          |
| 3,969,567 | A |   | 7/1976  | Occleshaw et al. |
| 4,098,701 | A |   | 7/1978  | Burrill et al. |
| 4,177,176 | A |   | 12/1979 | Burrill et al. |
| 4,406,703 | A |   | 9/1983  | Guthrie et al. |
| 4,497,688 | A |   | 2/1985  | Schaefer      |
| 4,510,020 | A |   | 4/1985  | Green et al.  |
| 4,637,860 | A |   | 1/1987  | Harper et al. |
| 4,647,505 | A |   | 3/1987  | Blackie et al. |
| 4,944,842 | A |   | 7/1990  | Stromberg et al. |

(List continued on next page.)

FOREIGN PATENT DOCUMENTS

| AU | 515151      | 3/1981 |
| DE | 36 01 736 A1| 1/1986 |
| EP | 484283      | 6/1992 |
| GB | 1003850     | 8/1963 |
| WO | WO 91/01409 | 2/1991 |

OTHER PUBLICATIONS

XP002197953 & JP 2001 240458 A, Kamishima Kagaku Kogyo KK)Database WPI, Section Ch. Week 200212, Derwent Publications Ltd., London, GB; Class L02, AN 2002–085436, Sep. 4, 2001 abstract.

*Primary Examiner*—Elizabeth Wood
(74) *Attorney, Agent, or Firm*—Knobbe Martens Olson & Bear LLP

(57) ABSTRACT

This invention discloses a new technology related to cellulose fiber reinforced cement composite materials using the loaded cellulose fibers. This invention discloses four aspects of the technology: fiber treatment, formulation, method and final product. This technology advantageously provides fiber cement building materials with the desirable characteristics of reduced water absorption, reduced rate of water absorption, lower water migration, and lower water permeability. This invention also impart the final products improved freeze-thaw resistance, reduced efflorescence, reduced chemical dissolution and re-deposition, and improved rot and fire resistances, compared to conventional fiber cement products. These improved attributes are gained without loss in dimensional stability, strength, strain or toughness.

45 Claims, 8 Drawing Sheets

U.S. PATENT DOCUMENTS

| | | |
|---|---|---|
| 4,971,658 A | 11/1990 | Henricson et al. |
| 4,985,119 A | 1/1991 | Vinson et al. |
| 5,021,093 A | 6/1991 | Beshay |
| 5,030,289 A | 7/1991 | Sattler et al. |
| 5,047,086 A | 9/1991 | Hayakawa et al. |
| 5,063,260 A | 11/1991 | Chen et al. |
| 5,102,596 A | 4/1992 | Lempfer et al. |
| 5,118,225 A | 6/1992 | Koch et al. |
| 5,191,456 A | 3/1993 | Sutherland et al. |
| 5,223,090 A | 6/1993 | Klungness et al. |
| 5,405,498 A | 4/1995 | Pease |
| 5,415,734 A | 5/1995 | Backlund et al. |
| 5,465,547 A | 11/1995 | Jakel |
| 5,520,779 A | 5/1996 | Bold |
| RE35,460 E | 2/1997 | Klungness et al. |
| 5,643,359 A | 7/1997 | Soroushian et al. |
| 5,795,515 A | 8/1998 | Fischer |
| 5,804,003 A | 9/1998 | Nishizawa |
| 5,876,561 A | 3/1999 | Tsai |
| 5,897,701 A | 4/1999 | Soroushian et al. |
| 5,989,335 A | 11/1999 | Soroushian et al. |
| 6,030,447 A | 2/2000 | Naji et al. |
| 6,045,057 A | 4/2000 | Moor et al. |
| 6,086,998 A | 7/2000 | Wihsmann et al. |
| 6,138,430 A | 10/2000 | Van Acoleyen et al. |
| 6,228,215 B1 | 5/2001 | Hoffman, Jr. |

\* cited by examiner

FIBER CEMENT COMPOSITE MATERIALS USING CELLULOSE FIBERS LOADED WITH INORGANIC AND/OR ORGANIC SUBSTANCES

RELATED APPLICATIONS

This application claims the benefit of U.S. Provisional Application No. 60/237,850, filed on Oct. 4, 2000, which is hereby incorporated by reference in its entirety.

BACKGROUND OF THE INVENTION

1. Field of the Invention

This invention relates to cellulose fiber reinforced cement composite materials using loaded cellulose fibers, including formulations, methods of manufacture and final products with improved material properties relating to the same.

2. Description of the Related Art

Ordinary Portland cement is the basis for many products used in building and construction, primarily concrete and steel reinforced concrete. Cement has the enormous advantage that it is a hydraulically settable binder, and after setting it is little affected by water, compared to gypsum, wood, wood particle boards, fiberboard, and other common materials used in building products. This is not to say that water has no effect on cement. Some dissolution of chemical components does occur when cement is saturated with fresh water, and these can be transported and re-deposited in different places if the cement is once again dried.

Asbestos Fiber Cement Technology

About 120 years ago, Ludwig Hatschek made the first asbestos reinforced cement products, using a paper-making sieve cylinder machine on which a very dilute slurry of asbestos fibers (up to about 10% by weight of solids) and ordinary Portland cement (about 90% or more) was dewatered, in films of about 0.3 mm, which were then wound up to a desired thickness (typically 6 mm) on a roll, and the resultant cylindrical sheet was cut and flattened to form a flat laminated sheet, which was cut into rectangular pieces of the desired size. These products were then air-cured in the normal cement curing method for about 28 days. The original use was as an artificial roofing slate.

For over 100 years, this form of fiber cement found extensive use for roofing products, pipe products, and walling products, both external siding (planks and panels), and wet-area lining boards. Asbestos cement was also used in many applications requiring high fire resistance due to the great thermal stability of asbestos. The great advantage of all these products was that they were relative lightweight and that water affected them relatively little, since the high-density asbestos/cement composite is of low porosity and permeability. The disadvantage of these products was that the high-density matrix did not allow nailing, and methods of fixing involved pre-drilled holes.

Although the original Hatschek process (a modified sieve cylinder paper making machine) dominated the bulk of asbestos cement products made, other processes were also used to make specialty products, such as thick sheets (say greater than about 10 mm which required about 30 films). These used the same mixture of asbestos fibers and cement as with the Hatschek process, although sometimes some process aid additives are used for other processes. For example, fiber cement composites have been made by extrusion, injection molding, and filter press or flow-on machines.

Two developments occurred around the middle of the last century that had high significance to modem replacements of asbestos based cement composites. The first was that some manufacturers realized that the curing cycle could be considerably reduced, and cost could be lowered, by autoclaving the products. This allowed the replacement of much of the cement with fine ground silica, which reacted at autoclave temperatures with the excess lime in the cement to produce calcium silica hydrates similar to the normal cement matrix. Since silica, even when ground, is much cheaper than cement, and since the autoclave curing time is much less than the air cured curing time, this became a common, but by no means universal manufacturing method. A typical formulation would be about 5–10% asbestos fibers, about 30–50% cement, and about 40–60% silica.

The second development was to replace some of the asbestos reinforcing fibers with cellulose fibers from wood. This was not widely adopted except for siding products and wet-area lining sheets. The great advantage of this development was that cellulose fibers are hollow and soft, and the resultant products could be nailed rather than by fixing through pre-drilled holes. The siding and lining products are used on vertical walls, which is a far less demanding environment than roofing. However, cellulose reinforced cement products are more susceptible to water induced changes, compared to asbestos cement composite materials. A typical formulation would be about 3–4% cellulose, about 4–6% asbestos, and either about 90% cement for air cured products, or about 30–50% cement and about 40–60% silica for autoclaved products.

Asbestos fibers had several advantages. The sieve cylinder machines require fibers that form a network to catch the solid cement (or silica) particles, which are much too small to catch on the sieve itself. Asbestos, although it is an inorganic fiber, can be "refined" into many small tendrils running off a main fiber. Asbestos fibers are strong, stiff, and bond very strongly with the cement matrix. They are stable at high temperatures. They are stable against alkali attack under autoclave conditions. Hence, asbestos reinforced fiber cement products are themselves strong, stiff (also brittle), and could be used in many hostile environments, except highly acidic environments where the cement itself is rapidly attacked chemically. The wet/dry cycling that asbestos roofing products were subjected to, often caused a few problems, primarily efflorescence, caused by the dissolution of chemicals inside the products when wet, followed by the deposition of these chemicals on the surfaces of the products when dried. Efflorescence caused aesthetic degradation of roofing products in particular, and many attempts were made to reduce it. Because the matrix of asbestos reinforced roofing products was generally very dense (specific gravity about 1.7), the total amount of water entering the product even when saturated was relatively low, and the products generally had reasonable freeze thaw resistance. If the density was lowered, the products became more workable (for example they could be nailed) but the rate of saturation and the total water absorption increased and the freeze thaw performance decreased.

Alternative Fiber Cement Technologies

In the early 1980's, the health hazards associated with mining, or being exposed to and inhaling, asbestos fibers started to become a major health concern. Manufacturers of asbestos cement products in the USA, some of Western Europe, and Australia/New Zealand in particular, sought to find a substitute for asbestos fibers for the reinforcement of building and construction products, made on their installed manufacturing base, primarily Hatschek machines. Over a period of twenty years, two viable alternative technologies have emerged, although neither of these has been successful in the full range of asbestos applications.

In Western Europe, the most successful replacement for asbestos has been a combination of PVA fibers (about 2%) and cellulose fibers (about 5%) with primarily cement (about 80%), sometimes with inert fillers such as silica or limestone (about 10–30%). This product is air-cured, since PVA fibers are, in general, not autoclave stable. It is generally made on a Hatschek machine, followed by a pressing step using a hydraulic press. This compresses the cellulose fibers, and reduces the porosity of the matrix. Since PVA fibers can't be refined while cellulose can be, in this Western European technology the cellulose fiber functions as a process aid to form the network on the sieve that catches the solid particles in the dewatering step. This product is used primarily for roofing (slates and corrugates). It is usually (but not always) covered with thick organic coatings. The great disadvantage of these products is a very large increase in material and manufacturing process costs. While cellulose is currently a little more expensive than asbestos fibers at $500 a ton, PVA is about $4000 a ton. Thick organic coatings are also expensive, and hydraulic presses are a high cost manufacture step.

In Australia/New Zealand and the USA, the most successful replacement for asbestos has been unbleached cellulose fibers, with about 35% cement, and about 55% fine ground silica, such as described in Australian Pat. No. 515151 and U.S. Pat. No. 6,030,447, the entirety of which is hereby incorporated by reference. This product is autoclave cured, as cellulose is fairly stable in autoclaving. It is generally made on a Hatschek machine, and it is not usually pressed. The products are generally for siding (panels and planks), and vertical or horizontal tile backer wet area linings, and as eaves and soffits in-fill panels. The great advantage of these products is that they are very workable, even compared to the asbestos based products, and they are low cost.

However, cellulose fiber cement materials can have performance drawbacks such as lower resistance to water induced damages, higher water permeability, and higher water migration ability (also known as wicking) compared to asbestos cement composite materials. These drawbacks are largely due to the presence of water conducting channels and voids in the cellulose fiber lumens and cell walls. The pore spaces in the cellulose fibers can become filled with water when the material is submerged or exposed to rain/condensation for an extended period of time. The porosity of cellulose fibers facilitates water transportation throughout the composite materials and can affect the long-term durability and performance of the material in certain environments. As such, conventional cellulose fibers can cause the material to have a higher saturated mass, poor wet to dry dimensional stability, lower saturated strength, and decreased resistance to water damage.

The high water permeability of the cellulose reinforced cement materials also results in potentially far greater transport of soluble chemicals within the product. The soluble chemicals can then re-deposit on drying, either externally, causing efflorescence, or internally, in capillary pores of the matrix or fiber. Because the materials are easier to saturate with water, the products also are far more susceptible to freeze/thaw damage. However, for vertical products, or eaves and soffit linings, and for internal linings, none of these water-induced disadvantages are very relevant.

To summarize, the replacement of asbestos in Europe has been largely by air cured fiber cement products, using PVA fibers, and pressed after forming in the green state. The primary problem with this technology is increased material and manufacturing cost. The replacement of asbestos in USA and Australia/New Zealand has been largely by autoclaved fiber cement products, using cellulose fibers, and formed with lower density without pressing. The primary problem with this technology is increased rate, and quantity of water absorption into the product when wet.

Several prior art references disclose the use of fibrous materials in cement products, as well as various processes for treating the fibrous materials. However, most of these references are directed to increasing the bond strength of the fibrous material to the cement, rather than addressing the water and moisture related issues of cellulose and/or other fibers. Many of these references disclose methods for treating the fibrous material by mineralization, thereby forming precipitates on the surface of the fibrous material. For example, U.S. Pat. No. 5,795,515 describes an air-cured product including a high percentage of cement (e.g., 70–80%) and cellulose fibers which have been mineralized by pretreating the fibrous material with aluminum sulfate, and subsequently adding amorphous silica to the fibers. Similarly, U.S. Pat. No. 2,377,484 discloses woody and vegetable fibers, such as excelsior, which are treated with sodium silicate and calcium chloride to precipitate calcium chloride on the fibers.

The purpose of mineralizing the fibers in these and other references is to provide a coating which serves to bond the fibers with the cement. Other references also relate to increasing the bond strength between the fibrous materials and the cement. For example, U.S. Pat. No. 1,571,048 discloses a process of mineralizing a fibrous material such as sawdust with a solution of a metallic salt. The mineral compound precipitates in and on the sawdust, which when mixed with cement enables the sawdust to firmly adhere to the cement.

In the context of cellulose fibers, the increased bond strength to which the above references are directed is desired because cellulose fibers as found in their natural state are held together with lignin which make it difficult to bond the fiber to cement. However, the teachings of the patents above are not specifically directed to the use of partially delignified and individualized fibers, which generally bond well with cement and therefore would not require such treatment methods. In addition, when held together by lignin, cellulose fibers do not encounter the same degree of water and moisture related damage, such as discussed above, that are encountered when using partially delignified and individualized fibers. This is because lignin is substantially more waterproof than the cellulose fibers within the lignin.

Accordingly, what is needed is a method for preventing water damage and other problems in fiber cement building materials incorporating partially delignified and individualized fibers, and the associated material formulations and products resulted therefrom.

SUMMARY OF THE INVENTION

The preferred embodiments of the present invention disclose a new technology, namely cellulose fiber reinforced cement composite materials using loaded cellulose fibers. The cellulose fibers are preferably individualized fibers, wherein at least a portion of the lignin has been removed from the cellulose. Aspects of the technology disclosed include formulations, methods of making the composite materials, and final materials and their properties. This technology advantageously provides fiber cement building materials with the desirable characteristics of reduced water absorption, reduced rate of water absorption, lower water migration, and lower water permeability.

Final products made from these materials have improved freeze-thaw resistance, reduced efflorescence, reduced dissolution and re-deposition of water-soluble matrix components in natural weathering. It is possible, with the proper fiber loading, to improve other product properties, for example, rot and fire resistances, compared to conventional fiber cement products. It has been found, surprisingly, that these improved attributes are gained without loss in dimensional stability, strength, strain or toughness. Even more surprisingly, strength, strain and toughness may even be improved with less cellulose being used than conventional cellulose fiber cement composite materials.

More particularly, Applicant has found that by filling, or partially filling the internal hollow spaces of cellulose fibers with insoluble inorganic and/or organic materials, an engineered cellulose fiber can be produced that, when used in cement composites, still has the advantages of regular cellulose fibers of refining, autoclaving, and manufacture without pressing, but the resultant fiber cement material also approaches or exceeds the performance advantages of artificial fibers such as PVA, in terms of the rate and amount of water absorption when used in fiber reinforced cement composite materials. What is more surprising is that smaller quantities of fibers may be used, so that the cost of loading or partially loading the fiber can be offset by the lower usage of the fiber in products, without a reduction in the important physical properties of the material, such as strength and toughness.

In particular, certain preferred embodiments show that when used in formulations typical of autoclaved cellulose based fiber cement, the rate of water absorption and the amount of water absorption are greatly reduced in the composite product, thus reducing the tendency to efflorescence, or to dissolve and re-deposit chemicals internally to the product, or to suffer freeze/thaw damage.

Also, the fibers may still be refined to act as a catch medium in the Hatschek process, they may still be autoclaved without excessive fiber degradation, and they make products adequate in strength without pressing. Moreover, most surprisingly, even with lower amounts of actual cellulose fiber, the preferred embodiments experience no reduction in key physical properties such as strength, stiffness, toughness and moisture movement, and may, in fact, improve some of these properties, especially toughness.

Thus, the use of engineered loaded fibers imparts to the composite material these enhanced properties, and therefore constitutes an alternative technology that, when fully implemented, has the potential to improve mechanical properties and the workability with the material in building and construction, while improving the durability of the products in various environments including especially those that involve cyclic wetting and drying, fire, freezing and thawing, and exposure to the atmosphere, regardless of the means of manufacture. They are particularly suitable to the Hatschek process that requires a refineable fiber (to catch solid particles) and to the autoclave curing cycle that allows the replacement of cement with fine ground silica, although they may also be of use in the air cured products, in conjunction with PVA, to reduce the necessity of the expensive process pressing.

Accordingly, the preferred embodiments of the present invention relate to a new technology of making fiber reinforced cement composite materials using loaded cellulose fibers. This new technology includes formulations, manufacturing processes and final composite materials. These embodiments will reduce water permeability, water absorption, efflorescence, internal water dissolution and re-deposition of materials, and improve durability in freeze/thaw weathering environments. These can be accomplished while maintaining or improving key mechanical and physical properties, especially toughness, surprisingly with less cellulose fiber than would be used in normal cellulose fiber cement. Moreover, this technology is also beneficial for solving one of the key problems of air cured, PVA reinforced fiber cement, by eliminating the need for the expensive process of hydraulic pressing of the formed "green" body, to crush the cellulose fibers and reduce water permeability in finished products.

In one aspect of the present invention, a composite building material is provided comprising a cementitious matrix and individualized cellulose fibers incorporated into the cementitious matrix. The cellulose fibers are partially or completely delignified. The cellulose fibers have voids that are at least partially filled with loading substances that inhibit water from flowing therethrough.

In another aspect of the present invention, a material formulation used to form a composite building material comprises a cementitious binder and cellulose fibers, wherein the cellulose fibers have been individualized and wherein at least some of the cellulose fibers are loaded with insoluble substances to inhibit water migration through the fibers. In one embodiment, the building material formulation preferably comprises about 10%–80% cement, about 20%–80% silica (aggregate), about 0%–50% density modifiers, about 0%–10% additives, and about 0.5%–20% loaded individualized cellulose fibers or a combination of loaded cellulose fibers, and/or regular unloaded fibers, and/or natural inorganic fibers, and/or synthetic fibers. The materials from these formulations can be autoclave cured or air-cured.

In another embodiment, a building material formulation is provided for an unpressed, autoclaved, fiber cement product. This formulation comprises about 20–50% cement, more preferably about 35%, about 20–80% fine ground silica, more preferably about 55%. Additionally, about 0–30% other additives and density modifiers may be included in the formulation. The formulation preferably includes about 0.5–20% fibers, more preferably about 10% fibers, of which some fraction of the fibers is individualized cellulose fibers loaded with inorganic and/or organic materials that reduce water flow in the fiber pore space.

The voids in these loaded fibers are partially or completely filled with insoluble substances to inhibit water from flowing through. Preferably, the insoluble substances have substantially the same or similar thermal and moisture expansion coefficients as that of the cement matrix. The insoluble substances may comprise organic compounds, inorganic compounds, or combinations thereof. The loading substances can comprise about 0.5%–200% of the dry weight of the cellulose fibers. Most commonly, loading substances in the loaded fibers are approximately 10%–80% of the cellulose weight.

Another aspect of the present invention relates to a method of manufacturing a fiber reinforced composite building material. The method in one embodiment comprises individualizing cellulose fibers by removing a majority of the lignin binding the cellulose fibers together, sometimes with aids of mechanical forces. At least a portion of the cellulose fibers is loaded with an insoluble substance to form loaded cellulose fibers, wherein the insoluble substance inside the fibers inhibits water flow through the fibers. The loaded fibers are mixed with a cementitious binder to form a fiber cement mixture. The fiber cement mixture is formed into a fiber cement article of a pre-selected shape and size.

The fiber cement article is cured so as to form the fiber reinforced composite building material.

The step of loading the fibers preferably comprises loading the fibers with inorganic compounds, organic compounds, or combinations thereof using techniques involving chemical reactions and/or physical depositions. Preferably, the step of mixing the loaded fibers with ingredients to form a fiber cement mixture comprises mixing the loaded fibers with non-cellulose materials such as a cementitious binder, aggregate, density modifiers, and additives in accordance with the preferred formulations of this invention. In another embodiment, the loaded fibers can also be mixed with conventional unloaded fibers and/or natural inorganic fibers, and/or synthetic fibers along with the other ingredients. The fabrication processes can be any of the existing technologies, such as Hatcheck process, extrusion, and molding, etc. Advantageously, in one embodiment the fiber cement article can be autoclaved.

Testing of certain embodiments of fibers with filled voids shows an increase in toughness of the final product by more than about 50%, an increase in the modulus of rupture (MOR) of more than about 15%, and an increase in the modulus of elasticity (MOE) in a bending test by more than about 15%, as compared to a building product made from an equivalent formulation with conventional cellulose fibers. Furthermore, application of the loaded fibers reduces the volume of the pores of the building material in the range of 1–10 micrometers by more than about 30%, more preferably so that the specific pore volume of the fiber cement composites using the loaded fibers is less than about 6 $\mu L/g$, measured by MIP (Mercury Intrusion Porosimetry).

Advantageously, the preferred embodiments of the present invention provide fiber reinforced building materials that have reduced water migration, lower water absorption rate, lower water permeability, less efflorescence, less severe dissolution and re-deposition problems, and improved freeze-thaw resistance, strain, and toughness as compared with a building material made from an equivalent formulation without loaded cellulose fibers. Furthermore, the preferred building materials are dimensionally stable and retain the advantages of cellulose fiber reinforced materials. Furthermore, the building material with loaded fibers can be manufactured using conventional processes for fiber cement material. Less cellulose fibers are required in making the composite materials with the enhanced physical/mechanical properties. These and other advantages of the present invention will become more fully apparent from the following description taken in conjunction with the accompanying drawings.

DETAILED DESCRIPTION OF THE PREFERRED EMBODIMENTS

Figure 1:
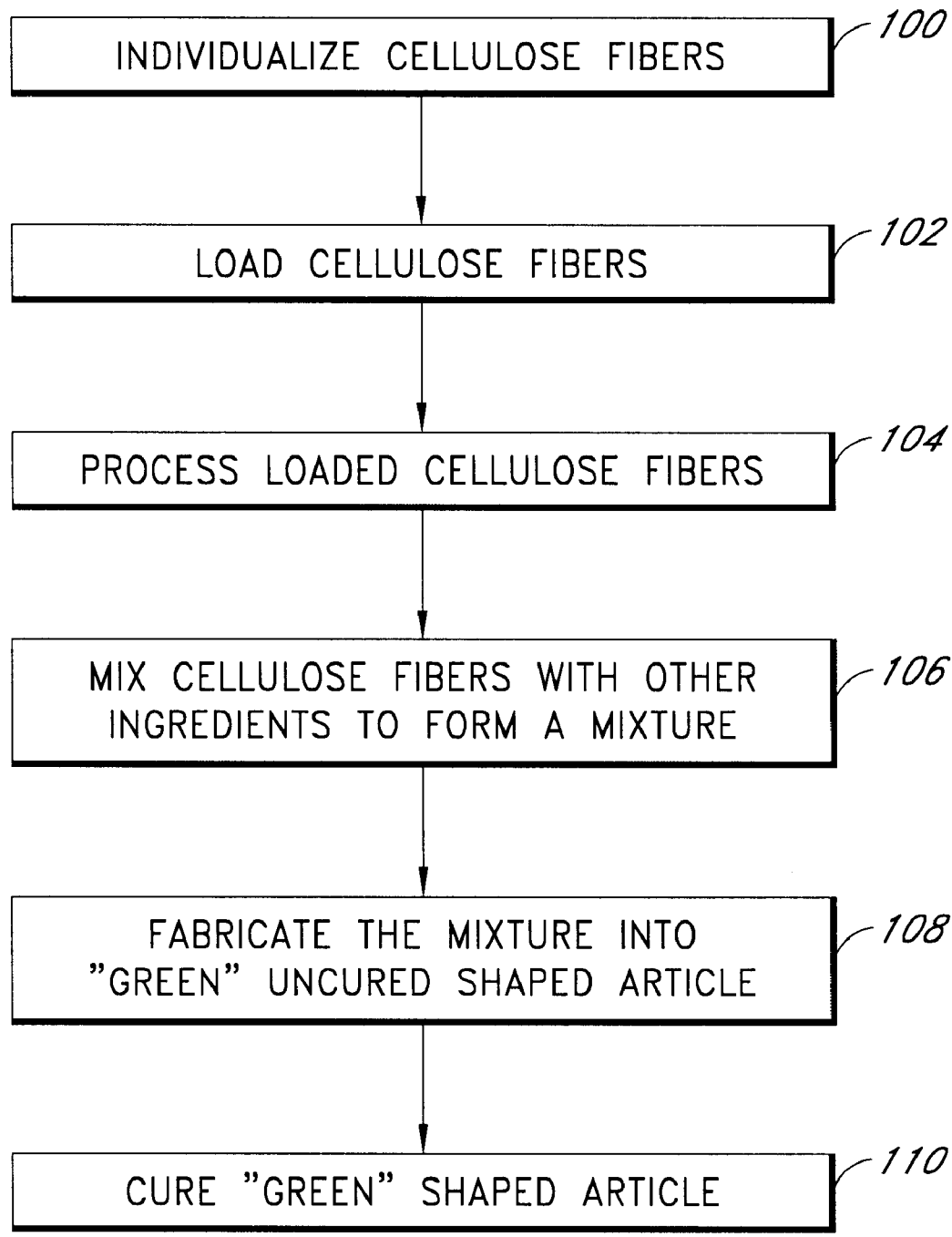
FIG. 1 illustrates a process flow for manufacturing a fiber reinforced cementitious building material according to one embodiment of the present invention.

The preferred embodiments of the present invention describe the use of filled or loaded cellulose fibers in cementitious fiber reinforced composite materials. These embodiments encompass not only the composite materials formed with loaded fibers, but also the formulation and the methods of manufacture of the composite materials.

The loaded fibers may be used in conjunction with other fiber treatments which further improve the water resistance or other properties of fiber reinforced cement materials. Further details on related chemical treatment of fibers, particularly treating the individualized cellulose fibers, in order to improve the resistance of the resulting building material to water and/or environmental degradation, are found in Applicant's copending applications entitled FIBER CEMENT COMPOSITE MATERIALS USING SIZED CELLULOSE FIBERS Ser. No. 09/969,742 filed on Oct. 2, 2001; FIBER CEMENT COMPOSITE MATERIALS USING BIOCIDE TREATED DURABLE CELLULOSE FIBERS Ser. No. 09/969,964 filed on Oct. 2, 2001; and METHOD AND APPARATUS FOR REDUCING IMPURITIES IN CELLULOSE FIBERS FOR MANUFACTURE OF FIBER REINFORCED CEMENT COMPOSITE MATERIALS Ser. No. 09/970,389, filed on Oct. 2, 2001, the entirety of each of these applications being hereby incorporated by reference. It will be appreciated that the aspects of the present invention are not applicable solely to cellulose fiber reinforced cementitious products, and accordingly, the chemical treatments may be applied to building materials reinforced with other fibers in non-cement products as well.

In one preferred embodiment, this invention relates to the application of loaded, partially delignified and individualized cellulose fibers into cementitious cellulose fiber reinforced building materials. The loaded cellulose fibers generally comprise individualized cellulose fibers filled with one or more insoluble chemical compounds. Organic and/or inorganic compounds are preferably incorporated in the water conducting channels and voids present in the cellulose fiber lumens and cell walls. The loading methods may include chemical reactions and physical deposition or a combination of both. Advantageously, the substances that are deposited inside the fibers inhibit the transfer of water along the water conducting channels and voids, which in turn inhibits water migration in the fiber cement composite material. The loaded fibers preferably have non-cellulose contents from about 0.5%–200% based on the oven dry weight of cellulose fibers. More preferably, the loaded fibers contain up to about 80% by weight of non-cellulose substances. The lumens in the fibers can be loaded using methods such as those described in U.S. Pat. Nos. 4,510,020 and 5,096,539, the entirety of both of which are hereby incorporated by reference, or by any other methods.

The chemical compounds selected for fiber loading preferably do not interfere with cement hydration reactions or contaminate the process water. Moreover, the chemical compounds preferably provide some beneficial attributes to the fiber cement product such as those that provide better fire resistance or biological resistance. The loading substances preferably have the same or similar thermal and moisture expansion coefficients as that of the cementitious matrix. Chemical compounds that can be used include, but are not limited to, inorganic salts of sodium, potassium, calcium, zinc, copper, aluminum, and barium such as carbonate, silicate, chromate, aluminate, acetate, palmitate, oleate, stearate, sulfate, phosphate, or borate in all forms; clay of all kinds; cement of all types; calcium silicate hydrate of all kinds; and kaolin of all kinds, or mixtures thereof. Furthermore, organic compounds that can also be used include but are not limited to natural or petroleum waxes, polyolefins, acrylics, epoxies, urethane, and styrene butadiene rubber, plastics of all kinds, and other resins.

The loading of the fibers preferably causes the insoluble substances to occupy the pore spaces within the fiber voids and cells walls. More preferably, loading of the pore spaces takes place without causing the formation of significant precipitates on the surface of the fibers. Doing so will avoid altering the fiber surface characteristics. The loading compounds preferably have a particle size in the range of about 0.01 to 20 $\mu$m in diameter.

It will be appreciated that the above list of chemical compounds is merely illustrative of examples of substances that can be used for fiber loading. The loading substance can also be other suitable inorganic or organic compounds, or combinations thereof, depending on the particular attributes needed for the specific application of the fiber cement material. In one embodiment, calcium carbonate is loaded into the cellulose fibers using known methods of fiber loading such as those described in U.S. Pat. Nos. 5,223,090 and RE35,460, the entirety of both of which are hereby incorporated by reference.

Loaded cellulose fibers will reduce the rate and amount of water absorption in fiber composite materials with a cement-based matrix. A cement-based matrix of a fiber composite material in general comprises a cementitious binder, an aggregate, density modifiers, and various additives to improve different material properties. It will be appreciated that not all of these matrix components are necessary to formulate a suitable building product, and thus, in certain embodiments, the formulation may simply comprise cementitious binder and loaded cellulose fibers, while the general formulation comprises a cementitious matrix, loaded cellulose fibers, and other fibers (cellulosic or non-cellulosic).

The cementitious binder is preferably Portland cement but can also be, but is not limited to, high alumina cement, lime, high phosphate cement, and ground granulated blast furnace slag cement, or mixtures thereof.

The aggregate is preferably ground silica sand but can also be, but is not limited to, amorphous silica, micro silica, geothermal silica, diatomaceous earth, coal combustion fly and bottom ash, coal combustion bottom ash, rice hull ash, blast furnace slag, granulated slag, steel slag, mineral oxides, mineral hydroxides, clays, magnasite or dolomite, metal oxides and hydroxides, and polymeric beads, or mixtures thereof.

The density modifiers can be organic and/or inorganic lightweight materials with a density of less than about 1.5 g/cm$^3$. The density modifiers may include but are not limited to: plastic materials, expanded polystyrene and other foamed polymer materials such as expanded polyurethane, glass and ceramic materials, calcium silicate hydrates, microspheres, and volcanic ashes including perlite, pumice, shiraua basalt, and zeolites in expanded forms. The density modifiers can be natural or synthetic materials.

The additives can include, but are not limited to, viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, and polymeric resin emulsion, or mixtures of thereof.

The cellulose fibers, from which loaded cellulose fibers are derived, are preferably unrefined/unfibrillated or refined/fibrillated cellulose pulps from sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments.

The cellulose fibers used for reinforcing cement composite materials are predominantly individualized fibers with partial or complete removals of lignin components from the fiber cell walls. In one embodiment, at least 90% of the lignin components are removed from the fiber cell walls. These fibers are preferably prepared by chemical pulping methods, which rely mainly on the effects of chemicals to separate fibers. Based on the chemicals utilized in the process, the chemical pulping methods are classified as Soda, Kraft, Kraft-AQ, Soda-AQ, Oxygen Delignification, Kraft-Oxygen, Organic Solvent methods, and Sulfite pumping, steam explosion pulping or any other pulping techniques. In the chemical pulping process, lignin, which acts as glue holding cellulose and hemicellulose together to provide mechanical strength in the wood, is broken and dissolved by chemical reactions.

These chemical reactions are usually carried out in a reactor, often called a digester, under a high temperature around 150 to 250° C. for about 30 minutes to 2 hours. The cleavage of the bonds between lignin and cellulosic components results in weakening of the bonds among fibers. With aids of mild mechanical forces, cellulose fibers are then separated into individual fibers. By far the most common process for individualized fiber used in fiber cement composite materials is the Kraft process.

Loaded cellulose fibers can be used in a variety of composite materials all having a cementitious matrix with different proportions of cementitious binder, aggregates, additives, density modifiers, and loaded and/or unloaded cellulose fibers or other non-cellulose fibers to obtain optimal properties for a particular application. In one embodiment, the composite formulation contains up to about 50% loaded fibers by weight, more preferably about 0.5% to 20%. Furthermore, the loaded fibers may be blended with conventional unloaded cellulose fibers, and/or natural inorganic fibers, and/or alkali resistant glass fibers or coated glass fibers, and/or synthetic polymer fibers in different proportions. It will be appreciated that the percentage of loaded cellulose fibers may be varied depending on the desired application and/or process. Furthermore, in the cementitious matrix the proportion of the cementitious binder, aggregate, density modifiers, and additives can also be varied to obtain optimal properties for different applications, such as roofing, deck, paving, pipes, siding, fencing, trim, soffits, or backer for tile underlayment.

Most of the embodiments described herein can be encompassed by the following formulation:

Matrix:
about 10%–80% cementitious binder;
about 20%–80% silica (aggregates);
about 0%–50% density modifiers, and
about 0%–10% additives.

Fibers:
about 0.5%–20% loaded cellulose fibers or a combination of loaded cellulose fibers, and/or regular unloaded fibers, and/or natural inorganic fibers, and/or synthetic fibers.

It will be appreciated that for fiber cement articles that are to be air-cured, higher amounts of cement will preferably be used, for example 60–90%, without incorporating any silica or aggregate, and usually other fibers will be used as well as loaded cellulose fibers. In autoclaved embodiments, a lower amount of cement can be used with, commonly, loaded cellulose fibers only. In one embodiment, the formulation for autoclaved fiber cement composite materials of the present invention comprises:

Matrix:
about 20–50% cement, more preferably about 25–45%, even more preferably about 35%;
about 30% –70% fine ground silica, more preferably about 60%;
about 0–50% density modifiers; and
about 0–10% additives, more preferably about 5%.

Fibers:
about 2%–20% fibers, more preferably about 10% fibers, wherein some fraction (often 100%) of the fibers is cellulose fibers loaded with inorganic and/or organic materials that reduce water flow in the fiber pore space.

Preferably, the loaded fibers have a freeness of 150 to 750 degrees of Canadian Standard Freeness (CSF) in accordance with TAPPI method T 227 om-99. The cementitious binder and aggregate have surface areas of about 250 to 400 m$^2$/kg and about 300 to 450 m$^2$/kg, respectively. The surface area for both the cement and silica is tested in accordance with ASTM C204-96a.

FIG. 1 illustrates a preferred process of manufacturing a fiber reinforced cementitious composite material incorporating loaded cellulose fibers. As FIG. 1 shows, the process begins with step 100 in which the fibers are individualized, preferably by a chemical pulping process such as described above. It will be appreciated that in performing this preferred manufacturing process, however, the chemical pulping step may not be necessary. This is because individualizing of fibers is often done by the fiber manufacturer, who then provides the fibers to the buyer on standard lap sheets or rolls. Thus, in one embodiment, the individualization of such fibers merely includes mechanically separating the fibers from the sheets or rolls, such as by hammer milling, hydra-pulping, refining or other methods, as described in step 104 below.

In step 102, the individualized cellulose fibers are loaded with loading substances. Preferably, the loading substances are insoluble in water. In step 102, the water conducting channels and voids in the cellulose fibers lumens and cell walls are filled with one or more chemical compounds using loading techniques such as chemical reactions and physical deposition or a combination of both, as described above. These loading techniques preferably occur in the presence of water or organic solvents, with the loading of the fibers preferably occurring upon contact of the chemical compounds with the cellulose fibers. More preferably, the loading techniques occur at ambient temperatures, or less than about 100° C. In the chemical loading process, several soluble components will dissolve in the pulp slurry and penetrate into the fiber cell walls. Reactions are triggered by changing pH, temperature, reagent dosages, radiation, pressure, ionic strengths, or other conditions. As a result, insoluble reaction products are formed and deposited inside the fibers. Examples of chemical deposition are described in U.S. Pat. Nos. 5,223,090 and RE 35,460, where soluble $Ca(OH)_2$ is first dissolved in a pulp slurry and then $CO_2$ gas is bubbled through the slurry. $Ca(OH)_2$ will react with $CO_2$ to form insoluble $CaCO_3$ inside the fibers. Fiber loading by physical deposition is usually accomplished without chemical reaction involvement. Often, the fiber loading is accomplished by a combination of both chemical and physical depositions.

It will be appreciated that fibers may be available from a fiber manufacturer already individualized and loaded. However, to ship the fibers, in one embodiment the fibers are then made into dry forms such as in laps and rolls, and thus, require individualization again once they arrive at the fiber cement manufacturing facility. In another embodiment, the loaded fibers are made into wet forms such as in wet laps and slurry in containers. In another embodiment, the fibers are dried by some special means (such as flash drying) and transported individualized in a silo or containers.

For embodiments where the fibers are made into laps or rolls, the loaded fibers in step 104 are subsequently processed to again individualize the fibers. The fiber processing (step 104) typically involves fiber dispersion and fibrillation. In one embodiment, the fibers are dispersed at a consistency of about 1% to 6% in a hydra-pulper, which also imparts some fibrillation. Further fibrillation can be achieved using a refiner or series of refiners. Once dispersed, the fibers are then fibrillated to a range of about 100 to 750 degrees of CSF (Canadian Standard Freeness), more preferably between about 100 to 750 degrees of CSF, more preferably between about 180 to 650 degrees of CSF. Dispersion and fibrillation can also be achieved by other techniques such as hammer-milling, deflakering, refining, shredding, and the like. Furthermore, use of loaded fibers without fibrillation is also acceptable for some products and processes. In another embodiment, the processing step 104 further comprises flash drying the fibers to a moisture content of about 5% to 50% using conventional flash drying systems.

It will be appreciated that the individualizing, loading and processing steps described above need not occur in the order described above. For example, loading of the fibers could take place before individualizing of the fibers. Furthermore, the processing step 104 may not be necessary if the fibers come directly from the fiber manufacturer individualized, or if individualization occurs at the fiber cement manufacturing facility. In these embodiments, after fiber loading, the loaded fibers can be added directly into the mix, as described below.

As FIG. 1 shows, in step 106, the loaded cellulose pulps are proportionally mixed with the other ingredients to form a mixture which can be a waterborne slurry, or a semi-dry paste, depending on the fabrication process to be used. In one embodiment, the loaded cellulose fibers are mixed with cement, silica, a density modifier and other additives in a well-known mixing process to form a slurry or paste. In the mixer, regular cellulose fibers and/or natural inorganic fibers, and/or synthetic fibers can be blended with the loaded fibers.

The process follows with step 108 in which the mixture may be formed into a "green" or uncured shaped article using a number of conventional manufacturing processes as would be known to one of skillful in the art, such as the:

Hatschek sheet process;
Mazza pipe process;
Magnani process;
Injection molding;

Extrusion;
Hand lay-up;
Molding;
Casting;
Filter pressing;
Fourdrinier forming;
Multi-wire forming;
Gap blade forming;
Gap roll/blade forming;
Bel-Roll forming;
Wellcrete
Others.

These processes may also include post-forming processes such as pressing, embossing and others, after the article is formed. More preferably, no pressing is used. The processing steps and parameters used to achieve the final product using a Hatschek process are similar to what is described in Australian Pat. No. 515151.

Following step 108, the "green" or uncured shaped article is cured in step 110. The article is preferably pre-cured. The pre-curing can be carried out in a pre-cure chamber at elevated temperature and relative humidity, or in a pre-cure chamber at elevated temperature and low humidity. Or preferably, the pre-curing is done for up to 80 hours at ambient temperature, most preferably 24 hours or less. The article can then be air-cured for approximately 30 days. More preferably, the pre-cured articles is autoclaved at an elevated temperature and pressure in a steam saturated environment at about 60 to 200° C. for about 3 to 30 hours, more preferably about 24 hours or less. The time and temperature chosen for the pre-cure and cure processes are dependent on the formulation, the manufacturing process, the process parameters, and the final form of the product.

Test Results—Mechanical & Physical Properties

Applications of loaded cellulose fibers in fiber reinforced composite materials desirably improve the mechanical and physical properties of the final building product. Fiber cement products using loaded cellulose fibers have improved dimensional stability, lower water migration (wicking), reduced water permeability, reduced water absorption rate and final mass, reduced efflorescence and improved freeze-thaw resistance. The use of loaded cellulose fibers also does not compromise the physical and mechanical properties of the product. In some instances, fiber cement materials incorporated with loaded cellulose fibers have better mechanical properties than those using regular cellulose fibers.

TABLE 1

Formulations for Table 2 Test Results

| Formula Identification | Hydraulic Binder Portland Cement | Aggregate Silica | Fiber Loaded Cellulose | Fiber Unloaded Cellulose |
|---|---|---|---|---|
| A | 35% | 57% | 8% | 0% |
| B | 35% | 57% | 8% | 0% |
| C | 35% | 57% | 0% | 8% |

Table 1 above lists illustrative fiber cement formulations having loaded cellulose fibers (Formulations A and B), compared to a control having an equivalent formulation but without loaded cellulose fibers (Formulation C). The oven dry densities of the specimens from Formulation A, B and C are, respectively, about 1.3, about 1.3 and about 1.2 g/cm$^3$. The loaded cellulose fibers in Formulations A and B contain about 45% and 55% of non-cellulose substances, respectively. The loaded substances in the loaded fibers for Formulation A and B are the same in chemical composition: 44.38% $SiO_2$, 18.13% $Al_2O_3$, 0.24% MgO, 24.34% CaO, 5.01% NaO and 7.73% $SO_3$, expressed as weight percent of total loading substance. In other embodiments, the loading substances may include combinations of calcium carbonate, calcium silicate, aluminum sulfate, sodium hydroxide, and other substances.

TABLE 2

Property Comparison of Fiber Reinforced Cement Composite Materials With and Without Loaded Cellulose Fibers

| | Formulations | | |
|---|---|---|---|
| Physical Properties | A | B | C (Control) |
| MOR (MPa) | 9.16 | 8.85 | 5.85 |
| Strain (μm/m) | 4257 | 6093 | 4670 |
| MOE (GPa) | 6.05 | 6.52 | 3.25 |
| Toughness (KJ/m$^3$) | 2.66 | 4.47 | 2.03 |
| Saturated Density (Kg/m$^3$) | 1.78 | 1.80 | 1.70 |
| Moisture Expansion (%) | 0.215 | 0.225 | 0.220 |

Modulus of rupture (MOR), strain, modulus of elasticity (MOE) and toughness are tested by three-point bending under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." Moisture expansion is the change in product length from saturated to oven dry conditions. The % change moisture expansion equation is:

$$\frac{Length_{initial} - Length_{final}}{Length_{final}} \times 100$$

Table 2 above provides an illustrative comparison of various mechanical and physical properties of fiber cement products made with formulations that incorporate loaded cellulose fibers and those that use conventional, unloaded cellulose fibers. Prototype samples of fiber cement materials are produced based on three different formulations (A, B, C). As shown in Table 1, Formulations A and B include loaded cellulose fibers while Formulation C uses conventional, unloaded cellulose fibers.

It will be appreciated that the fiber cement formulations are selected for comparison purposes only and that a variety of other formulations can be used without departing from the scope of the present invention.

As Table 2 shows, key mechanical properties such as modulus of rupture (MOR), modulus of elasticity (MOE), and toughness are generally the same or slightly higher for Formulations A and B with loaded cellulose fibers when compared to an equivalent formulation, Formulation C, the control formulation, without loaded fibers. An equivalent formulation is herein defined as one in which the weight of loaded cellulose fibers are displaced by an equivalent weight of unloaded cellulose fibers. In the examples provided, the loaded cellulose fibers increase the modulus of rupture (MOR) of the building product by more than about 50% and increases the modulus of elasticity (MOE) of the building product by more than about 80% as compared to a building product made from an equivalent formulation without loaded cellulose fibers. However, it will be appreciated that the 50% improvement in MOR and the 80% improvement in MOE are merely exemplifying results. By varying the amount and/or composition of loaded fibers, it will be appreciated that the physical and mechanical properties, such as MOR, MOE, strain and toughness, etc., of the final products can be changed to meet specific application needs.

Table 2 also shows that moisture expansion and saturated density of the materials are not compromised when loaded fibers are used. Moisture expansion is an indication of the wet-dry dimensional stability of the product as it measures the percent change in product length from oven dried conditions to saturated conditions. Wet-dry dimensional stability is especially important for exterior applications of building materials in which the materials are subject to severe climatic changes. In particular, dimensionally stable materials minimize the deformation that may occur at the joints between sheets of building material and reduces the possibility of sheet cracking due to stress caused by dimensional changes.

Applicants have also found that formulations having smaller amounts of loaded cellulose fibers are required to achieve the same or better overall mechanical/physical properties, compared to an equivalent formulation having a greater amount of cellulose fibers which are not loaded. For example, a building material having about 4.5% of fiber weight in the loaded cellulose fibers may have approximately the same strength and toughness as a building material having about 8% unloaded cellulose fibers. In another embodiment, the building material made from loaded cellulose fibers incorporates 10% less cellulose fibers than a building material made from an equivalent formulation without loaded cellulose fibers to obtain approximately the same strength and toughness. The saving by using less cellulose can be used to offset the processing cost of loading fibers.

Pore Size Distribution

Figure 2:
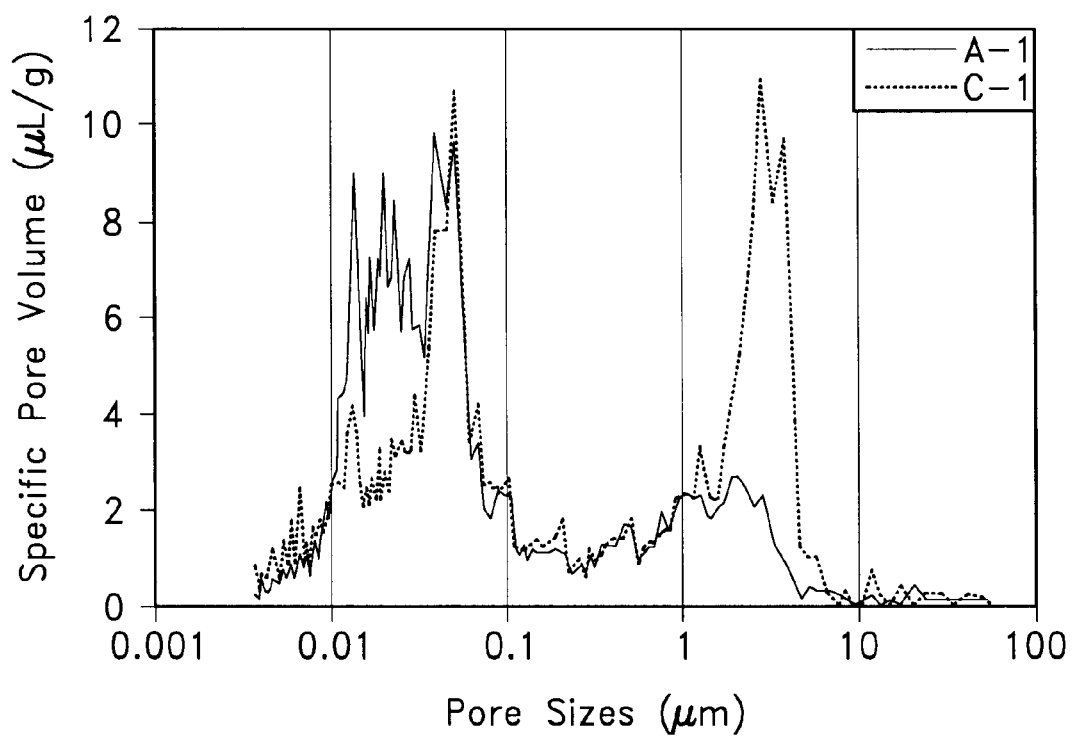
FIG. 2 is a graph comparing the pore size distributions of fiber cement materials made with loaded cellulose fibers in accordance with one preferred embodiment and fiber cement materials made with conventional, unloaded fibers. The porosity is measured by MIP (Mercury Intrusion Porosimetry).

FIG. 2 displays a graph showing the approximate pore size distribution of sample materials made with Formulations A and C, measured by MIP (Mercury Intrusion Porosimetry). As shown in FIG. 2, application of loaded fibers in Formulation A substantially reduces the volume of pores in the size range of about 7 micrometers in diameter, which is the size range of pores found in most conventional cellulose fibers. FIG. 2 shows that when loaded fibers are used as in Formulation A, the volume of the pores in this size range is reduced by more than about 70% from about 11 $\mu$L/g to about 3 $\mu$L/g. The substantial reduction in volume of pores in this particular range is an indication that water transport channels through cellulose are blocked by the filling or loading substance. In one embodiment, the loaded cellulose fibers reduce the volume of the pores in the 1–10 $\mu$m size range by more than about 30% as compared to a building product made from an equivalent formulation without loaded cellulose fibers, such that the specific pore volume in this size range is less than about 6 $\mu$L/g, more preferably less than about 4 $\mu$L/g. Advantageously, the blocking of water transport cellulose fibers reduces water migration, water absorption rate, final water absorbed, and water permeability of the fiber cement composite material.

Water Migration (Wicking)

Figure 3A:
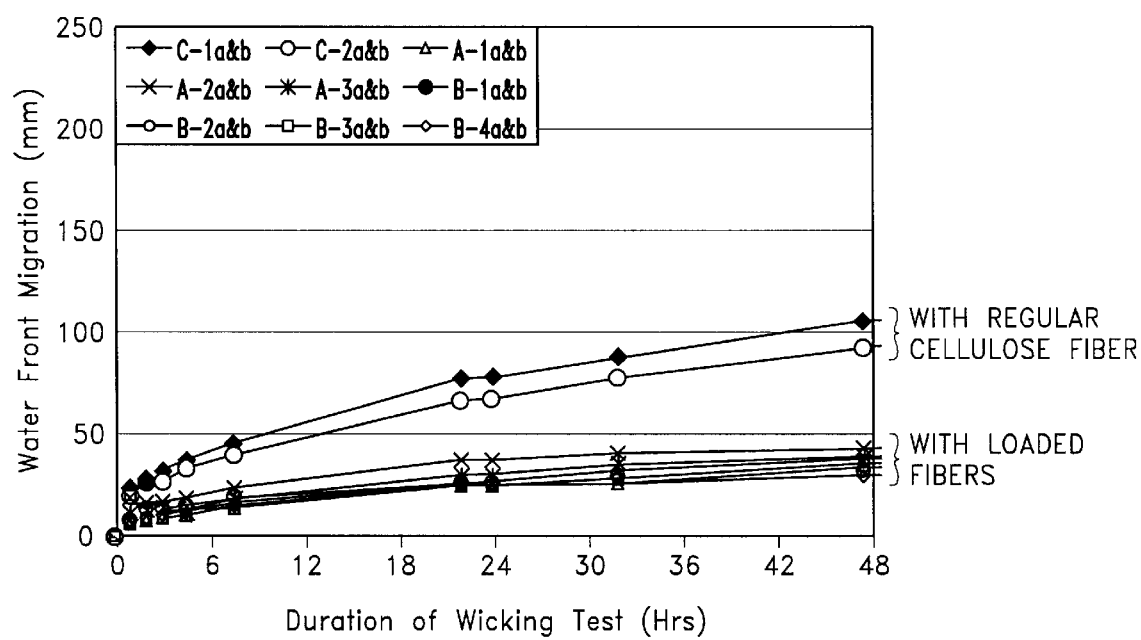
FIGS. 3A and 3B are graphs illustrating water migration test (wicking) results of fiber cement building materials made with loaded cellulose fibers in accordance with one preferred embodiment and fiber cement materials made with conventional, unloaded fibers.
Figure 3B:
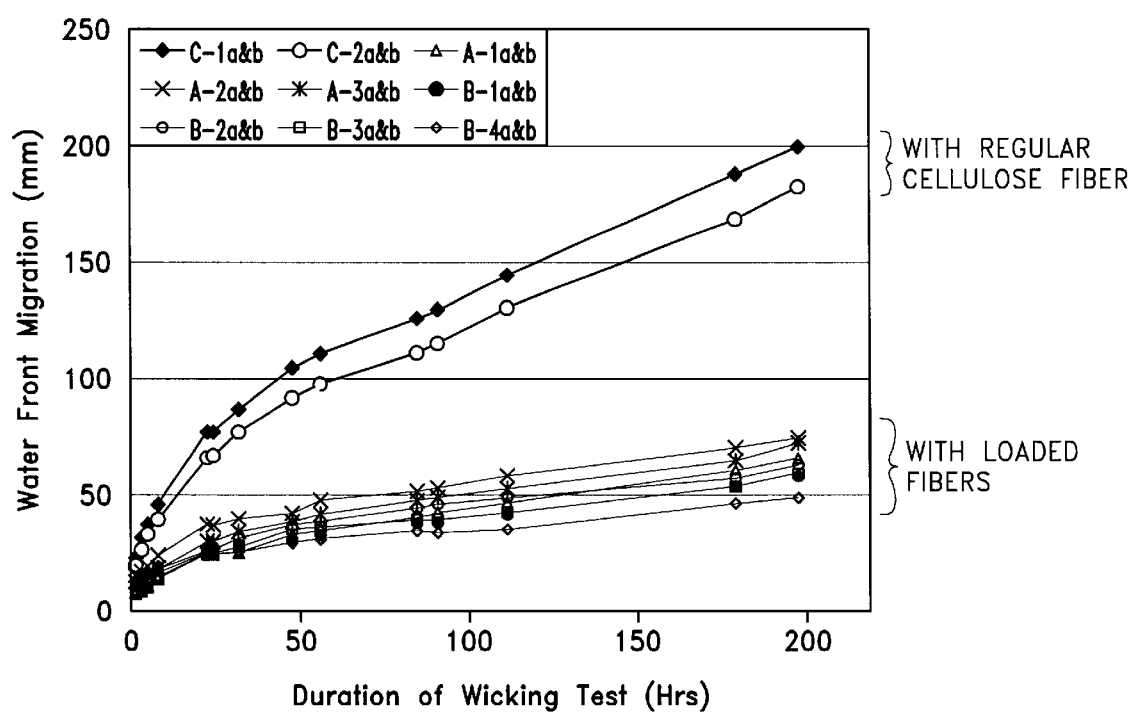

FIGS. 3A and 3B display graphical results of water migration (wicking) tests performed on materials made in accordance with Formulations A, B, and C. The water migration test comprises submerging the edges of each sample material in water and then measuring the distance of water front migration at different testing durations at ambient temperature. As FIG. 3A shows, the distance of water migration for sample materials made with loaded cellulose fibers in accordance with Formulations A and B are approximately 30 mm after 24 hours of testing, while the water migration distance for materials made from an equivalent formulation in accordance with Formulation C is approximately 75 mm, which is about 60% worse. In other embodiments, a building material formulation incorporating loaded fibers can be developed exhibiting approximately a 25% or more reduction in water wicking as compared to an equivalent formulation made without loaded fibers.

FIG. 3B shows that the water migration of samples made with loaded cellulose fibers levels off after about the first 50 hours of exposure to water while water migration of samples made from conventional cellulose fibers continues to increase without tapering. As FIG. 3B shows, after 200 hours of water exposure, the distance of water migration of samples made with conventional cellulose fibers is significantly higher (more than about 150% higher) than those made with loaded fibers. Advantageously, minimizing water migration significantly reduces the stress caused by water-induced swelling of the material and thus reduces the occurrence of cracks and fractures caused by the buildup of such stress.

Water Permeability

Figure 4A:
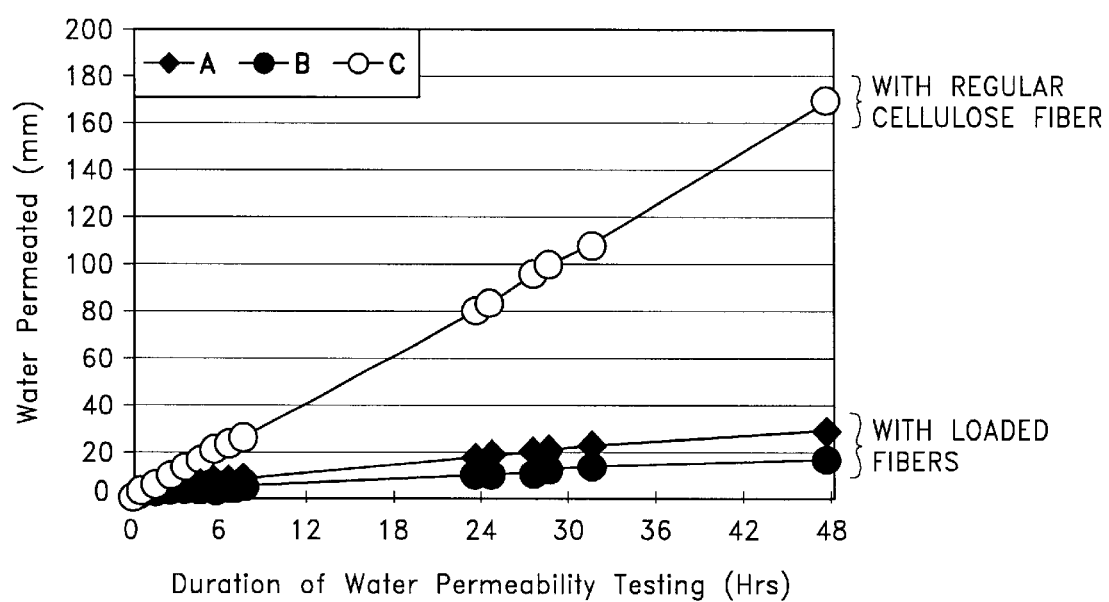
FIGS. 4A and 4B are graphs illustrating water permeability test results of fiber cement building materials made with the loaded cellulose fibers in accordance with one preferred embodiment and fiber cement materials made with conventional, unloaded fibers.
Figure 4B:
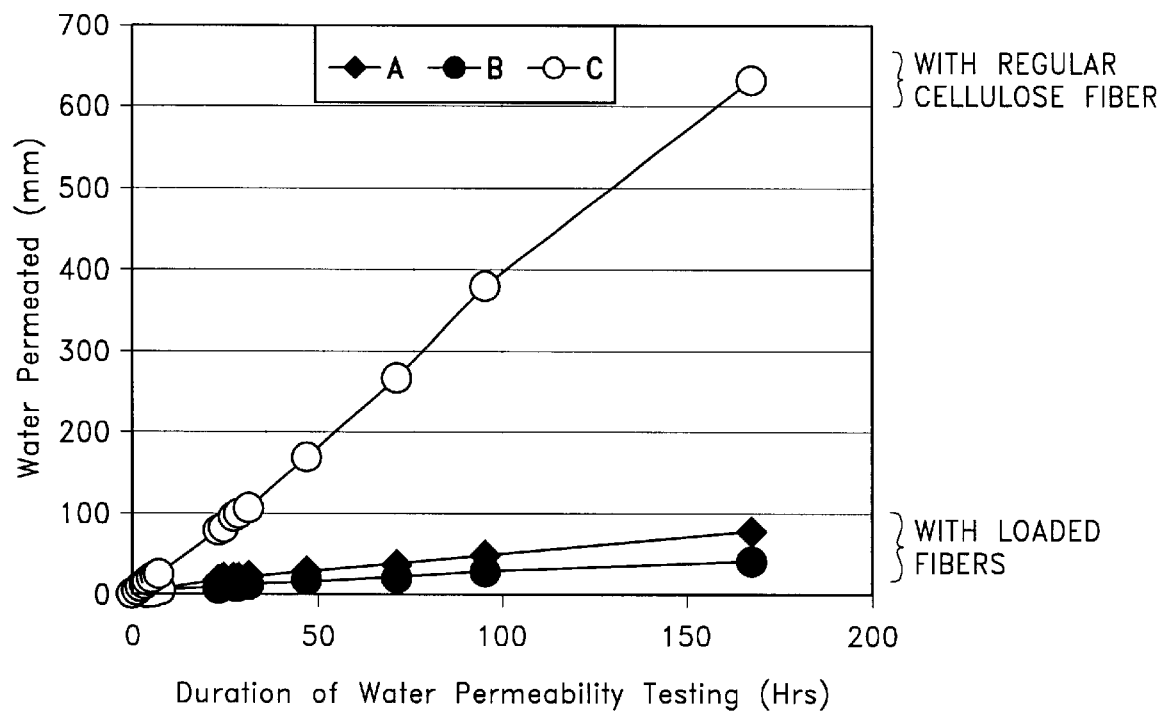

Furthermore, blocking of the water transport channels in cellulose fibers also reduces water penetration through the surface of the fiber cement material. FIGS. 4A and 4B show graphical results of water permeability tests performed on composite materials made in accordance with Formulations A, B, and C. The water permeability test comprises attaching a tube to a surface of the sample material in a manner such that one end of the tube is positioned adjacent the surface. The tube is made of an acrylic material that is about 125 mm long and has an inner diameter of about 50 mm. After the samples are pre-conditioned to equilibrium under 23+/−2° C. and 50+/−5% relative humidity, the tube is filled with water and the water level inside the tube is periodically recorded. The decrease in the water level in the tube is recorded as water permeated (mm). As FIG. 4A shows, after 24 hours of testing, the amounts of water permeated are about 82 mm, 18 mm and 10 mm for the samples made in accordance with Formulation C, A and B, respectively. The water permeability of sample materials made with loaded fibers using Formulations A and B has been reduced to less than about 25% of that of an equivalent formulation in accordance with Formulation C. Moreover, as shown in FIG. 4B, the amount of water permeated into samples made with loaded cellulose fibers levels off after 48 hours of exposure to moisture. However, the amount of water permeated into samples made without loaded fibers continues to increase without tapering. As shown in FIG. 4B, after 48 hours of exposure to water, the amount of water permeated into samples made with loaded fibers is significantly less than that of samples made with loaded cellulose fibers.

Advantageously, reduced water permeability makes the loaded fiber material particularly suitable for exterior applications such as roofing, piping, fencing and decking. Reduced water transport inside the fiber reinforced cement composite materials will slowdown the migration of the dissolvable chemicals in the fiber cement matrix and improve the efflorescence phenomenon of the final products.

Water Absorption

Figure 5A:
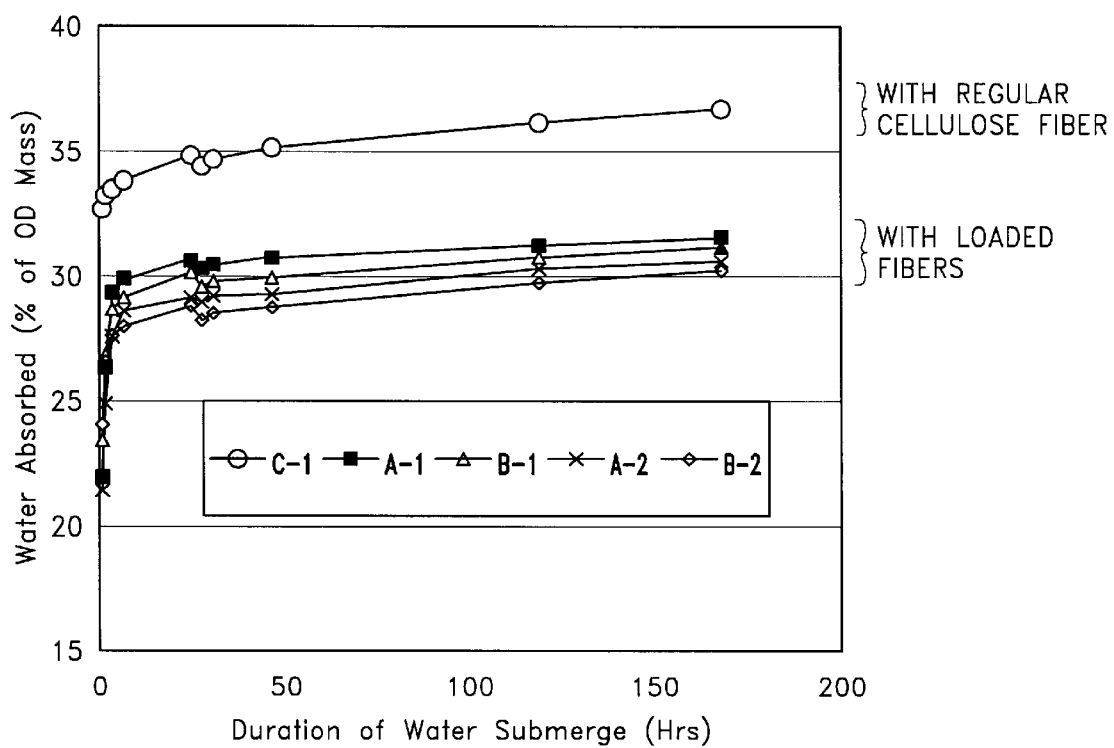
FIGS. 5A and 5B are graphs illustrating water absorption test results of fiber cement building materials made with loaded cellulose fibers in accordance with one preferred embodiment and fiber cement materials made with conventional, unloaded fibers.
Figure 5B:
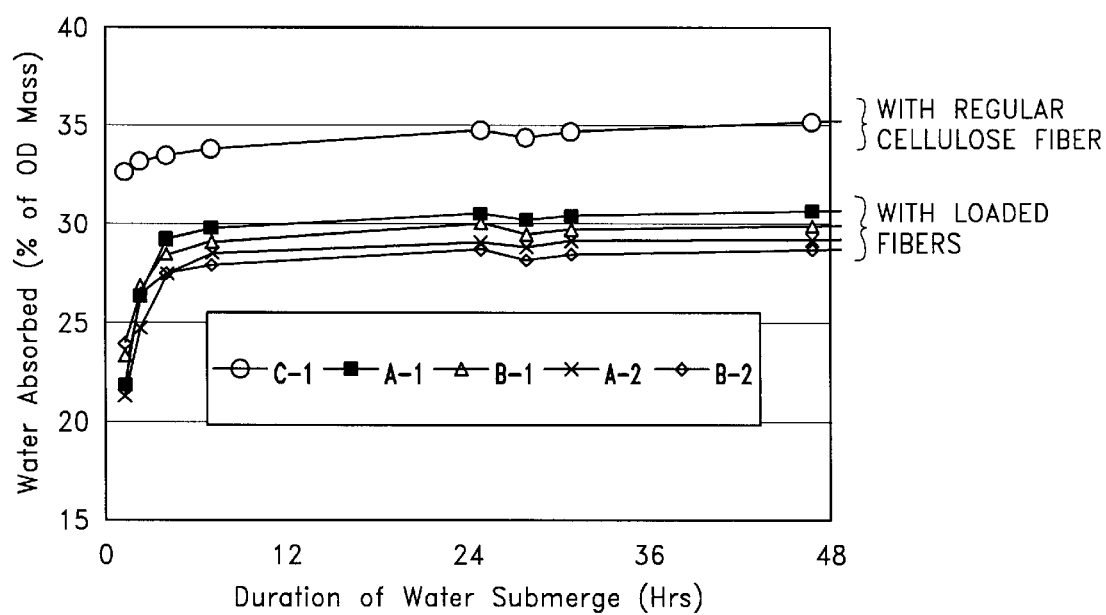

FIGS. 5A and 5B show graphical results of a dynamic water absorption test performed on composite materials made in accordance with Formulations A, B, and C. The test was performed in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." As these figures show, the rate of the water absorption of the sample materials made with loaded cellulose fibers using Formulations A and B is more than about 10%, preferably about 20%, lower than the material made with an equivalent formulation in Formulation C in the first 6 hours of test. Other embodiments will reduce the rate of water absorption by about 5% or more. The amount of water absorbed at the saturated state is about 10% lower when the loaded cellulose fibers are used in the formulation. Advantageously, the composite materials made with loaded fibers have a significantly lower water absorption rate, which in turn reduces the wet mass of the material. The high water resistance will also improve the freeze-thaw performance of the final products, minimize the issues associated with dissolution and re-deposition of substances inside the matrix, and improve the resistance to biological attacks.

Conclusions

In general, it will be appreciated that the preferred embodiments of the present invention, more particularly, a fiber-reinforced composite material containing loaded, individualized cellulose fibers have several advantages over the prior art. These materials made in accordance with the preferred processes and formulations have a low wet mass, lower rate of water absorption and lower water permeability, compared to conventional fiber cement composite materials. The improved water resistance reduces the opportunity for biological agents to survive and degrade the cellulose contained in the composite material. The high water resistance will improve the problems associated with dissolution and re-deposition externally (efflorescence) and internally of the composite materials. Furthermore, the loaded fibers also improve the biological durability and the fire resistance of fiber cement building materials. Also, the loaded fibers selectively change the physical and mechanical properties such as strain, modulus of rupture (MOR), toughness, and modulus of elasticity (MOE) and dimensional stability.

The preferred embodiments of this invention enable the inexpensive, autoclave-able and refine-able loaded cellulose fibers to be used in fiber reinforced cement composite materials to achieve comparable or in some ways better properties than PVA fiber reinforced cement composite materials that have been pressed and air cured. The formulations and processes disclosed can be applied to making a variety of building products, including but not limited to, interior and exterior panels, decking, paving, roofing, piping, tile backer, siding, trim, soffits, and fencing. Advantageously, building materials made with loaded cellulose fibers in a manner shown and described above have numerous favorable properties including but not limited to lowered water absorption, lower wicking, lower water permeability, higher moisture resistance, higher fire resistance, lower cellulose fiber usage, improved efflorescence, and higher rot resistance. These desirable attributes are gained without compromising other key physical/mechanical properties of the composite materials. The advantageous characteristics of the composite materials can also be achieved with less cellulose fibers being used.

Although the foregoing description of the preferred embodiments of the present invention have shown, described and pointed out the fundamental novel features of the invention, it will be understood that various omissions, substitutions, and changes in the form of the detail of the present patent as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A composite building material, comprising:
   a cementitious matrix; and
   individualized cellulose fibers incorporated into the cementitious matrix, the cellulose fibers having voids that are at least partially filled with loading substances that inhibit water from flowing therethrough, wherein the loading substances are substantially insoluble in water.

2. The composite building material of claim 1, wherein the loading substances have substantially the same thermal and moisture expansion coefficients as that of the matrix.

3. The composite building material of claim 1, wherein the loading substances comprise inorganic compounds.

4. The composite building material of claim 3, wherein the inorganic compounds are selected from the group consisting of inorganic salts of sodium, potassium, calcium, zinc, copper, aluminum, barium, and mixtures thereof, and therein the inorganic compounds are in a form selected from the group consisting of carbonate, silicate, chromate, aluminate, acetate, palmitate, oleate, stearate, sulfate, phosphate, borate, and mixtures thereof.

5. The composite building material of claim 3, wherein the inorganic compounds are selected from the group consisting of clay, cement, kaolin, calcium silicate hydrate, and mixtures thereof.

6. The composite building material of claim 1, wherein the loading substances comprise organic compounds.

7. The composite building material of claim 6, wherein the organic compounds are selected from the group consisting of waxes, polyolefins, acrylics, epoxies, styrene butadiene rubber, plastics, resins and mixtures thereof.

8. The composite building material of claim 1, wherein the loading substances comprise about 0.5% to 150% of the dry weight of the cellulose fibers.

9. The composite building material of claim 8, wherein the loading substances comprise up to 80% of the dry weight of the cellulose fibers.

10. The composite building material of claim 1, wherein the cellulose fibers are made from cellulose pulps of lignocellulosic materials by a pulping process.

11. The composite building material of claim 1, further comprising unloaded cellulose fibers.

12. The composite building material of claim 1, further comprising natural inorganic fibers, and synthetic fibers.

13. The composite building material of claim 1, wherein the specific pore volume of the loaded cellulose fibers in the composite material in the 1–10 $\mu$m range is less than about 6 $\mu$L/g, measured by mercury intrusion porosimetry (MIP).

14. The composite building material of claim 1, wherein the cementitious matrix incorporating the individualized cellulose fibers is autoclaved.

15. The composite building material of claim 14, comprising about 10–80% cement by weight.

16. The composite building material of claim 14, further comprising an aggregate.

17. The composite building material of claim 16, wherein the aggregate is ground silica.

18. A material formulation used to form a composite building material, comprising:
   a cementitious binder;
   an aggregate,
   a density modifier,
   cellulose fibers, wherein the cellulose fibers have been individualized and wherein at least some of the cellulose fibers are loaded with water insoluble substances to inhibit water migration through the fibers, wherein the cellulose fibers are partially or completely delignified, and additives.

19. The formulation of claim 18, wherein the cementitious binder comprises Portland cement.

20. The formulation of claim 18, comprising about 10–80% cement by weight.

21. The formulation of claim 18, comprising about 20–50% cement by weight.

22. The formulation of claim 18, wherein the cementitious binder has a surface area of about 250 to 400 $m^2$/kg.

23. The formulation of claim 18, wherein the cementitious binder is selected from the group consisting of high alumina cement, lime, high phosphate cement, ground granulated blast furnace slag cement, and mixtures thereof.

24. The formulation of claim 18, wherein the aggregate comprises silica having a surface area of about 300 to 450 $m^2$/kg.

25. The formulation of claim 18, wherein the aggregate is approximately 20%–80% of the formulation by weight.

26. The formulation of claim 18, wherein the aggregate comprises ground silica.

27. The formulation of claim 18, wherein the aggregate is selected from the group consisting of amorphous silica, micro silica, geothermal silica, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides, polymeric beads, and mixtures thereof.

28. The formulation of claim 18, wherein the loaded fibers comprise about 0.5%–20% of the formulation by weight.

29. The formulation of claim 18, wherein the loaded cellulose fibers are blended with unloaded cellulose fibers or natural inorganic fibers and synthetic fibers.

30. The formulation of claim 18, wherein the density modifier is up to about 50% of the formulation.

31. The formulation of claim 18, wherein the density modifier comprises lightweight substances with a density of less than about 1.5 grams per cubic centimeter.

32. The formulation of claim 18, wherein the density modifier is selected from the group consisting of plastic materials, expanded polystyrene or other foamed polymer materials, glass and ceramic materials, calcium silicate hydrates, microspheres and volcano ashes including perlite, pumice, shirasu basalt, zeolites in expanded forms, and mixtures thereof.

33. The formulation of claim 18, wherein the additives are up to about 10% by weight of the formulation.

34. The formulation of claim 18, wherein the additives are selected from the group consisting of viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, polymeric resin emulsion, and mixtures thereof.

35. The formulation of claim 18, wherein the loaded cellulose fibers increase the water resistance of the composite building material as compared to a building material made from an equivalent formulation without loaded cellulose fibers.

36. The formulation of claim 18, wherein the loaded cellulose fibers reduce the amount of water absorption of the composite building material in a 6 hour test by more than about 5% as compared to a building material made from an equivalent formulation without loaded cellulose fibers.

37. The formulation of claim 18, wherein the loaded cellulose fibers reduce the rate of water migration (wicking) of the composite building material by more than about 15% in a 24 hour test as compared to a building material made from an equivalent formulation without loaded cellulose fibers.

38. The formulation of claim 18, wherein the loaded cellulose fibers reduce the water permeability of the composite building material in a 24 hour test to about 15% or less than the water permeability of a building material made from an equivalent formulation without loaded cellulose fibers.

39. The formulation of claim 18, wherein the loaded cellulose fibers improve the freeze-thaw properties of the composite building material as compared to a building material made from an equivalent formulation without loaded cellulose fibers.

40. The formulation of claim 18, wherein the loaded cellulose fibers increase the biological resistance of the composite building material as compared to a building material made from an equivalent formulation without loaded cellulose fibers.

41. The formulation of claim 18, wherein the loaded cellulose fibers maintain or increase the physical and mechanical properties of the composite building material as compared to a building material made from an equivalent formulation without loaded cellulose fibers.

42. The formulation of claim 18, wherein the loaded cellulose fibers reduce the efflorescence of the composite building material as compared to a building material made from an equivalent formulation without loaded cellulose fibers.

43. The formulation of claim 18, wherein the loaded cellulose fibers reduce the volume of the pores of the composite building material in the 1–10 $\mu$m size range by more than about 20% as compared to a building material made from an equivalent formulation without loaded cellulose fibers.

44. The formulation of claim 18, wherein the specific pore volume of the loaded cellulose fibers within the composite building material in the 1–10 $\mu$m range is less than about 6 $\mu$L/g measured by mercury intrusion porosimetry (MIP).

45. A building material comprising a cementitious matrix, wherein the cementitious matrix incorporates individualized reinforcing fibers, wherein at least a portion of the fibers have voids that are at last partially filled with loading substances that are substantially insoluble in water, the loading substances inhibit water or other substances from occupying the voids.

* * * * *